Dec. 20, 1932. J. W. FITZ GERALD 1,891,592
METHOD OF CLEANING AND GAS FREEING HYDROCARBON STORAGE TANKS
Filed July 26, 1932 2 Sheets-Sheet 2
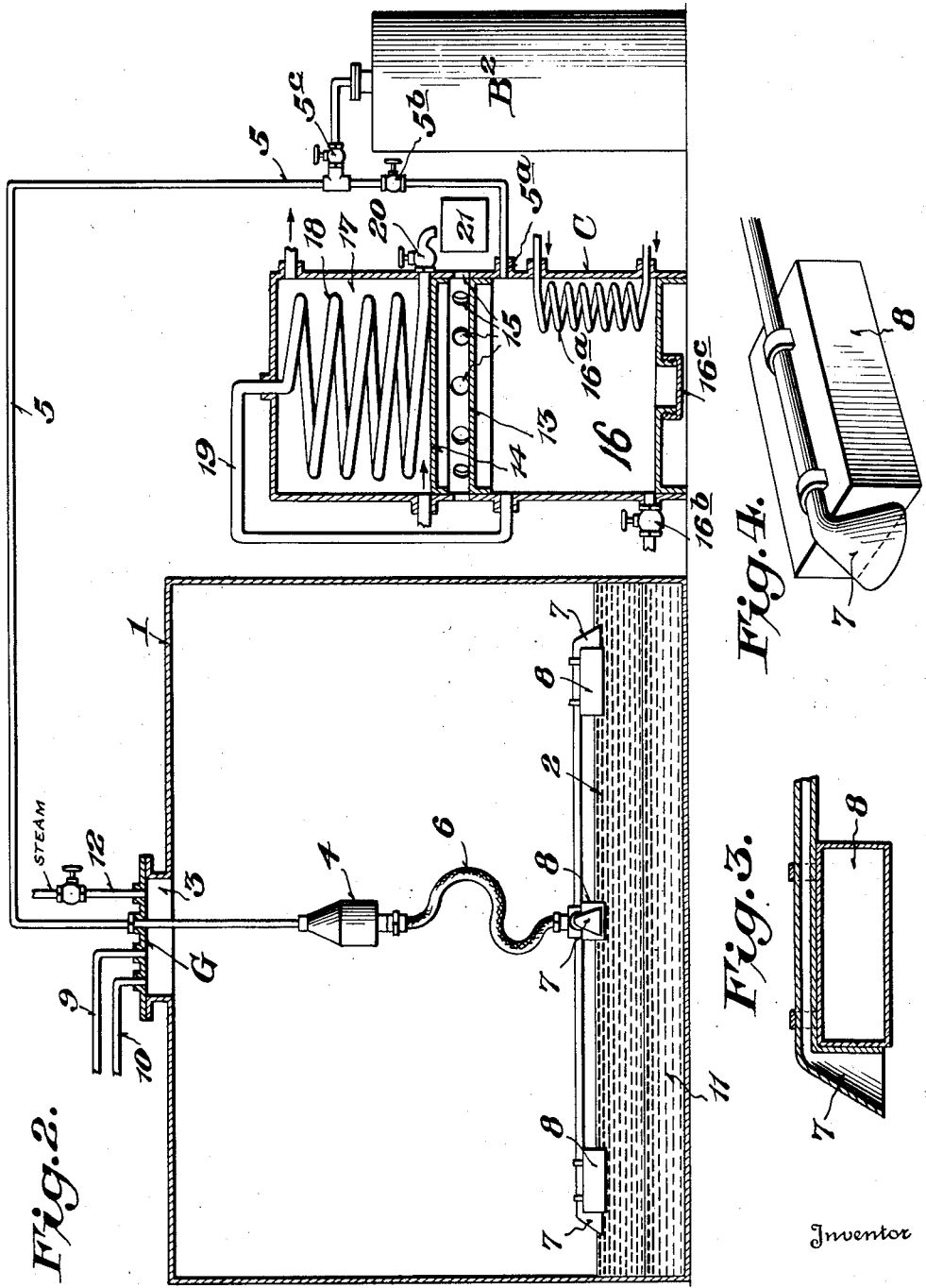
Inventor
James W. Fitzgerald,
By
Attorney Patented Dec. 20, 1932

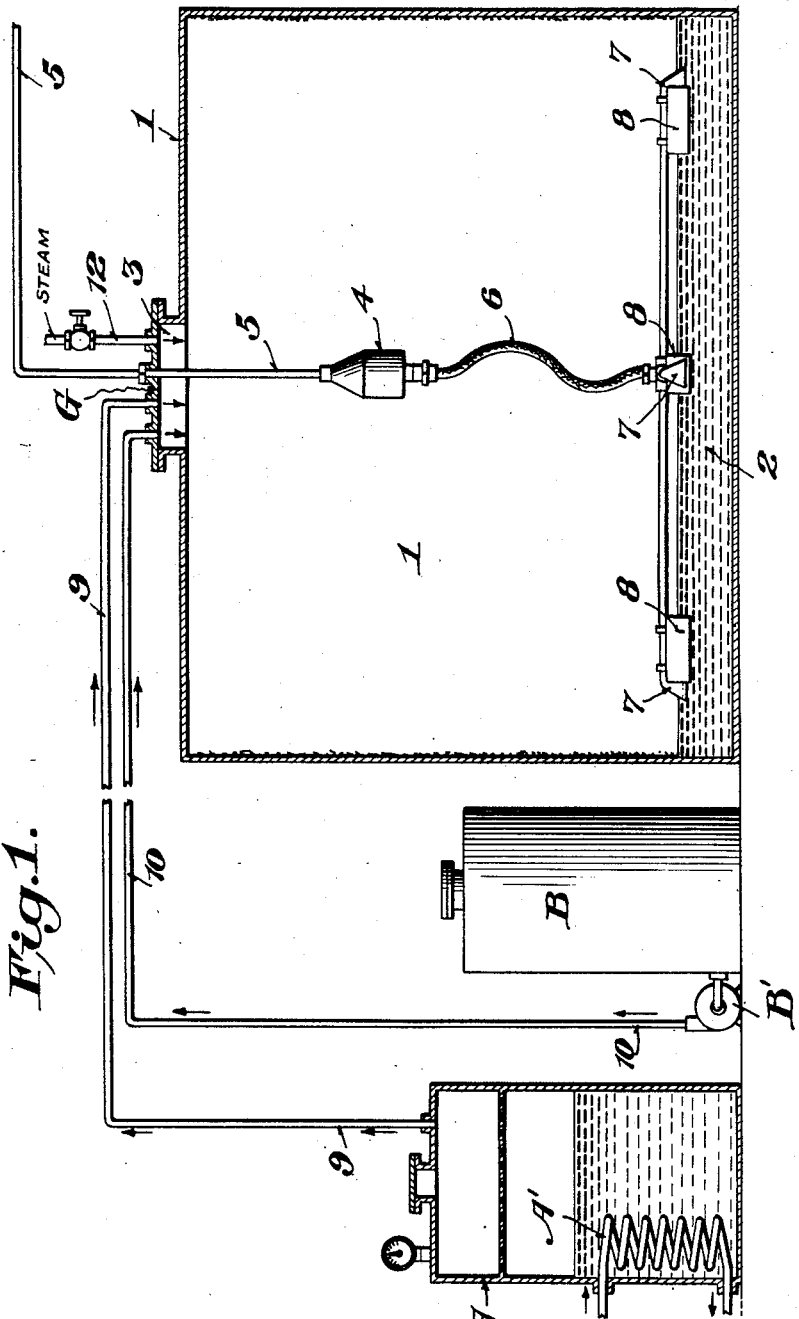

1,891,592

UNITED STATES PATENT OFFICE

JAMES W. FITZ GERALD, OF SAVANNAH, GEORGIA

METHOD OF CLEANING AND GAS-FREEING HYDROCARBON STORAGE TANKS

Application filed July 26, 1932. Serial No. 624,889.

This invention relates to a method and apparatus for cleaning and gas-freeing oil storage tanks.

Tanks for storing or carrying oil, for example, tank cars or compartments in ships, are required to be cleaned from time to time to remove hydrocarbon deposits from the walls thereof. According to prior practices it has been customary to clean out the tanks by using jets of hot water, steam, or jets of a hydrocarbon solvent of low volatility, such as kerosene. However, these methods are not only tedious and therefore expensive from the standpoint of the labor, time and materials required, but also do not thoroughly effect the cleaning operation and are likely to damage the plates forming the walls of the tank due to pressure of the fluid jets.

Also in the case of tanks on ships, it is frequently necessary to use a torch to make plate repairs while at the dock, and the danger incident to applying a flame near the residual hydrocarbon vapors can be readily appreciated. To eliminate this hazard it has been heretofore proposed to inject into the tank a volatile non-combustible vapor or gas which will have a cleaning or detergent effect on the hydrocarbon deposits and at the same time render the gaseous mixture in the tank non-inflammable. However, this method has also proved objectionable because the non-combustible vapor solvent combines with the hydrocarbon gas to form a poisonous gas which is dangerous to workmen required to enter the tank or otherwise dangerous because of its escape to adjacent compartments.

Accordingly, a primary object of the present invention is to provide a novel process which may be carried out in a simple and expeditious manner without the necessity of workmen entering the tank or compartment after the cleaning process has started. That is to say, it is proposed to provide a method whereby all of the necessary apparatus may be installed within the tank before the application of the cleaning vapor, such installation being effected by workmen using masks only to protect them from the hydrocarbon vapors if desired, and then the tank is sealed so that the entire cleaning and sludge removal operations can be automatically accomplished from the exterior of the tank.

A further object of the invention is to not only render the hydrocarbon vapors in the tank non-combustible by injecting a non-combustible vapor into the tank to mix with the hydrocarbon vapor, but to also use a low pressure steam injection to positively condense and precipitate the gaseous mixture thereby to free the tank or receptacle from poisonous gases or fumes. Therefore, in event repairs by workmen are necessary the same may be readily carried out with due regard both to the safety of men and equipment.

Another object of the invention is to effectively carry out the cleansing operation and recover with little or no loss, both the oil which is removed from the walls of the tank, as well as the vaporous cleansing medium which has been condensed by the steam and passes out with the oil sludge, and also recover the sludge-floating medium.

With the above and other objects in view which will more readily appear as the nature of the invention is better understood, the same consists in the novel construction, combination and arrangement of parts hereinafter more fully described, illustrated and claimed.

While various forms of apparatus may be used in carrying out the process, nevertheless, by way of illustration, reference may be made to the accompanying drawings, in which:—

Figure 1 is a diagrammatic view illustrating a tank to be cleaned and the apparatus employed in the preliminary steps of the method.

Figure 2 is also a diagrammatic view illustrating the apparatus employed in the removal steps.

Figure 3 is a detail sectional view of one of the floating suction heads.

Figure 4 is a detail perspective view of one of said heads.

Similar reference characters designate corresponding parts throughout the several figures of the drawings.

Referring to the drawings, the reference character 1 designates an oil storage tank of any type, such for example, as a tank car, compartment, or storage tank having the walls thereof coated with a film or deposit of oil, and also having, by way of example, a residual quantity of oil 2 in the bottom thereof. Such tanks are usually provided with a manhole or filling opening 3 which may be provided with a conventional cover in the well known manner. In practicing the present invention, the usual manhole cover is removed, and as a first step in the method, I insert therein the necessary apparatus for removing liquid from the bottom of the tank, which liquid includes not only the residual oil previously referred to, but also the oil sludge washed down from the sides of the tank, as will presently appear, and the chemicals used in the cleaning process. That is to say, I propose to first emplace the pumping or suction apparatus in the tank, and if the tank is small, such apparatus may be inserted through the manhole without the necessity of entering the tank, or on the other hand if the tank is of large capacity workmen can enter the tank to properly position the removal apparatus so as to facilitate the removal operation. By way of example, the liquid removal apparatus includes a suction pump 4 which may be of any of the well known types on the market, as for example, a type known as the "Pulsometer" steam pump which is connected with the discharge line 5 and the suction line 6 which is in turn connected with a plurality of suction heads 7 which may be mounted on the floats 8. The said floats may be of any suitable type, as for example, hollow copper members which will float on any liquid in the bottom of the tank, and, as the liquid level declines will follow the same so as to insure the complete removal of any and all liquids contained within the tank.

After the pumping or suction apparatus is installed in the tank, I then propose to place thereon a special sealing cover G and begin the cleaning process. Assuming that the tank 1 is empty except for the residual oil 2 in the bottom thereof, it is proposed to then fill the tank with a gaseous solvent agent by injecting the same into the tank through the pipe line 9. Any suitable non-combustible solvent may be used, but in practice I have found that carbon tetrachloride which is a halogenated aliphatic hydrocarbon, is the most practical gaseous agent to use. The carbon tetrachloride in liquid form may be placed in an apparatus designated generally as A and therein gasified or vaporized by the application of heat furnished by the steam coil A' or its equivalent. Thus, it will be understood that the vaporized carbon tetrachloride passes through the pipe line 9 into the tank 1 and will begin to attack the hydrocarbon deposits on the side walls of the tank so that as the process proceeds said deposit will be rendered fluid and will run down the sides of the tank to the bottom thereof. The relative strength and quantity of carbon tetrachloride vapor used depends largely upon the size of the tank and the formation of the hydrocarbon deposit, as will be readily apparent to those skilled in the art. In addition to the solvent characteristics of the carbon tetrachloride, it will also be understood that the same in mixing with the residual hydrocarbon vapors in the tank renders the latter non-combustible.

After the injection of the gaseous non-combustible solvent vapor, I then flow a solution of calcium chloride into the tank thereby to float the residual oil. The apparatus for use in this step consists of a suitable container B for the calcium chloride, the same having a pump B' associated therewith, the said pump being connected with a pipe line 10 which is led into the tank through the cover G. It will therefore be understood that after the step of injecting the solvent vapor into the tank, I propose to flow into the same a suitable quantity of calcium chloride to assist in the recovery of the residual oil and sludge. Various solutions of calcium chloride may be used, depending upon the gravity of the oil. However, I have found that a 30% solution will be practical for the average cleaning operation. As will be observed from Fig. 2, the calcium chloride solution designated as 11, being heavier than the oil 2 will sink to the bottom of the tank and thus float the oil 2.

As the next step of the process, I inject steam into the tank through the line 12. Sufficient steam is injected to insure the condensation of the mixture of the non-combustible solvent vapor and hydrocarbon gas, thereby not only to cause the same to thoroughly wash down the walls of the tank and carry the oil and condensed fumes or vapors down into the oil sludge formation which will float on the calcium chloride, but to also precipitate the gaseous mixture thereby to free the tank or receptacle from poisonous gases or fumes. If the deposits on the side walls of the tank have been found to be of unusually hard formation, the steps of injecting additional solvent vapor and subsequent steaming may be repeated to insure the thorough removal of all of the deposits from the wall of the tank. As previously explained, the tank is sealed before the vapor and steam are injected therein and therefore none of the vapors incident to the cleaning operations can escape, and the entire cleaning operation, as well as the subsequent removal operations, which will now be described, can be carried on from the outside of the tank without the necessity of workmen entering the tank until the operation has been entirely completed.

Referring now to the subsequent steps which relate to the removal of the liquids from the tank it may be pointed out that the pump 6 is started to operate and the oil, oil sludge and recondensed carbon tetrachloride may be first withdrawn due to the fact that the suction heads 7 float on the top of the oil. That is to say, the liquid withdrawn from the tank by the pump 4 is conducted through the pipe line 5 and the inlet 5ª of a reclaiming outfit designated generally as C. This reclaiming outfit consists of a receptacle having intermediate partitions 13 and 14 providing an air space which is open to the atmosphere through the ports 15. The partition 13, together with the lower half of the receptacle, provides an oil reclaiming compartment 16, while the upper partition 14, together with the upper portion of the apparatus provides a chamber 17 for receiving cooling water to chill the condenser coil 18. The compartment 16 is provided with a steaming coil 16ª and is also provided with a reclaimed oil outlet 16ᵇ and a clean-out door 16ᶜ. The liquid mixture pumped into the compartment 16 is heated by the steam coil 16ª and the liquid solvent (recondensed carbon tetrachloride) is volatilized and driven off from the hydrocarbons and led through the pipe 19 into the condenser coil 18. The effect of this operation is to separate the vaporous cleansing agent, carbon tetrachloride, from the oil and then to recondense the carbon tetrachloride vapor in the coil 18. The said coil may be provided with an outlet valve 20 which discharges into or is connected with a suitable receptacle 21. Thus, it will be apparent, that the reclaimed carbon tetrachloride may be reused. Likewise the oil remaining in the compartment 16 may be drawn off and reused.

As the pumping operation continues, there will of course be a point where all of the oil has been sucked out of the tank and the remaining liquid in the tank is calcium chloride. When the suction heads 7 get down to the body of calcium chloride, the valve 5ᵇ in the line 5 may be closed and the valve 5ᶜ opened thereby to divert the calcium chloride into a storage receptacle B². In that way the calcium chloride may be reclaimed and reused. Of course, there will be a point where both oil and calcium chloride will be removed when the oil level gets down to the level of the calcium chloride. In other words both oil and calcium chloride will be temporarily picked up together. However, by watching the pumping operation carefully it can be readily ascertained when all of the oil has been pumped out and what little calcium chloride passes along with the oil can readily be collected and reclaimed in the compartment 16.

When the pumping operation has been completed it will be apparent that all of the withdrawn liquids may be reclaimed and reused, thereby effecting considerable economy of operation.

I claim:—

1. A process for removing deposits from the interior of hydrocarbon storage tanks which consists in sealing the tank, injecting vaporous carbon tetrachloride, injecting a solution of calcium chloride to float the residual hydrocarbon, then injecting steam in sufficient quantity to condense and precipitate the gaseous mixture, and subsequently removing all liquids.

2. A process for gas-freeing and removing hydrocarbon deposits from closed containers which consists in injecting a halogenated aliphatic hydrocarbon vapor to erode the said deposits, subsequently injecting steam in sufficient quantity to condense and precipitate the gaseous mixture resulting from the injection of the vaporized halogenated aliphatic hydrocarbon, and finally removing the resulting sludge.

In testimony whereof I hereunto affix my signature.

J. W. FITZ GERALD.